United States Patent [19]
Klencke

[11] Patent Number: 5,867,709
[45] Date of Patent: Feb. 2, 1999

[54] METHOD AND SYSTEM FOR REUSING CUSTOMIZATIONS TO A SOFTWARE PRODUCT

[75] Inventor: David L. Klencke, Denver, Colo.

[73] Assignee: KaPRE Software, Inc., Boulder, Colo.

[21] Appl. No.: 544,786

[22] Filed: Oct. 18, 1995

[51] Int. Cl.[6] .................................................. G06F 9/44
[52] U.S. Cl. .......................................... 395/702; 395/683
[58] Field of Search ................................... 395/683, 685, 395/701, 702; 707/103

[56] References Cited

U.S. PATENT DOCUMENTS

| | | | |
|---|---|---|---|
| 5,404,525 | 4/1995 | Endicott et al. | 395/700 |
| 5,493,680 | 2/1996 | Danforth | 395/700 |
| 5,493,682 | 2/1996 | Tyra et al. | 395/700 |
| 5,560,014 | 9/1996 | Imamura | 395/700 |
| 5,581,761 | 12/1996 | Radia et al. | 395/702 |
| 5,590,270 | 12/1996 | Tsukuda | 395/701 |

OTHER PUBLICATIONS

Budd, Timothy, *An Introduction to Object–Oriented Programming,* Addison–Wesley Publishing Company, Reading, Massachusetts, 1991, pp. 121–134.

Lippman, Stanley, *C++ Primer,* 2nd Edition, Addison–Wesley Publiishing Company, Reading Massachusetts, 1991, pp. 215–276, 389–443.

*Primary Examiner*—James P. Trammell
*Assistant Examiner*—Kakali Chaki
*Attorney, Agent, or Firm*—Seed and Berry LLP

[57] ABSTRACT

The system described herein provides for the reusability of customizations to a software product. Once customizations are made to a software product, using the system described herein, if the software product is revised, the customizations made to the software product can be reused with little or no effort. The system described herein also facilitates the process of customizing the software product. In addition, the system described herein allows customizations made to one portion of the software product to be used by other portions of the software product. The system described herein performs its functionality by utilizing various object-oriented techniques. Object-oriented software products typically comprise a hierarchy of classes. For each class within the software product, the system described herein provides a corresponding empty class that is customizable. As such, the system described herein provides a class hierarchy for a software product that is divided into pairs of classes. Each pair of classes contains a standard class and an empty or shell class. The standard class contains functions and data to perform the functionality of the software product and the shell class contains customizations added by a customer. The customer of the software product may add whatever customizations they desire into the shell classes, which will then augment or supersede the processing of the corresponding standard class. The two classes within each pair of classes have a hierarchical relationship in which the standard class is the parent and the shell class is the child. In accordance with the system described herein, the pairs are arranged in the hierarchy in such a manner as to allow for the use of customizations within one shell class to be used by another. This hierarchical arrangement provides that when two pairs are to be placed in a parent-child relationship in the hierarchy, the shell class of the first pair is made a parent (i.e., base class) to the standard class of the second pair.

6 Claims, 6 Drawing Sheets

METHOD AND SYSTEM FOR REUSING CUSTOMIZATIONS TO A SOFTWARE PRODUCT

Technical Field

The present invention relates generally to data processing systems and, more particularly, to reusing customizations to a software product.

BACKGROUND OF THE INVENTION

Customers who purchase software products sometimes customize the software products to suit their needs. For example, a customer may customize the appearance of the user interface of the software product to their liking. After customizing the software product, it is not uncommon for the company that developed the software product to release a new version of the product. In this situation, the customizations that were made by the customer to the software product need to be reimplemented. That is, the customizations are typically not reusable in conventional software products. Thus, the customer must recustomize the software product, which is time-consuming and can introduce bugs into the software product. As such, it is desirable to design software products so that customizations are reusable when a new version of the software product is released.

SUMMARY OF THE INVENTION

The system described herein provides for the reusability of customizations to a software product. Once customizations are made to a software product, using the system described herein, if the software product is revised, the customizations made to the software product can be reused with little or no effort. The system described herein also facilitates the process of customizing the software product. In addition, the system described herein allows customizations made to one portion of the software product to be used by other portions of the software product. The system described herein performs its functionality by utilizing various object-oriented techniques. Object-oriented software products typically comprise a hierarchy of classes. For each class within the software product, the system described herein provides a corresponding empty class that is customizable. As such, the system described herein provides a class hierarchy for a software product that is divided into pairs of classes. Each pair of classes contains a standard class and an empty or shell class. The standard class contains functions and data to perform the functionality of the software product and the shell class contains customizations added by a customer. The customer of the software product may add whatever customizations they desire into the shell classes, which will then augment or supersede the processing of the corresponding standard class. The two classes within each pair of classes have a hierarchical relationship in which the standard class is the parent and the shell class is the child (i.e., the shell class directly inherits the standard class). In accordance with the system described herein, the pairs are arranged in the hierarchy in such a manner as to allow for the use of customizations within one shell class to be used by another. This hierarchical arrangement provides that when two pairs are to be placed in a parent-child relationship in the hierarchy, the shell class of the first pair is made a parent (i.e., base class) to the standard class of the second pair.

In accordance with a first aspect of the present invention, a method is practiced in a computer system for reusing customizations to a software product. In accordance with the first aspect of the present invention, the method creates standard classes that perform functionality of the software product, creates a corresponding shell class that is empty for each standard class to create pairs of classes, and forms a hierarchy of the pairs of classes. The hierarchy is formed where a first of the pairs of the classes is a parent to a second of the pairs of classes and wherein the shell class of the first pair of classes is a base class of the standard class of the second pair of classes. Further, the method revises the shell classes by a user to create customizations and invokes the customizations to perform customized processing.

In accordance with a second aspect of the present invention, a computer system for reusing customizations to a computer program is provided. The computer system comprises a memory and a processor. The memory contains a computer program for performing functionality that contains a hierarchy of pairs of classes. Each pair has a first class containing function members and data members for performing the functionality of the computer program and a second class containing user-definable customizations to the functionality for the computer program. The second class is a derived class of the first class and each of the pairs in the hierarchy are arranged such that when a first pair is to be a direct parent of a second pair in the hierarchy, the first class of the second pair is derived from the second class of the first pair. The processor of the computer system is for executing the computer program.

DETAILED DESCRIPTION OF THE INVENTION

A preferred embodiment of the present invention allows for the reusability of customizations to a software product. In accordance with the preferred embodiment, once customizations are made to a software product, if the software product is revised, the customizations made to the software product can be reused with little or no effort. The preferred embodiment also facilitates the process of customizing the software product. In addition, as will be further described below, the preferred embodiment allows customizations made to one portion of the software product to be used by other portions of the software product. For instance, customizations typically either add functionality to the software product or revise functionality already present in the software product. This feature of the preferred embodiment allows for customized functionality to be propagated throughout the software product. This feature is advantageous since it reduces replications of customizations throughout the software product.

As previously stated, the preferred embodiment provides for the reusability of customizations that are made to a software product. For the purposes of this disclosure, the term "software product" includes a computer program, module, library of functions or collection of classes. The preferred embodiment performs this functionality by utilizing various object-oriented techniques. Object-oriented software products typically comprise a hierarchy of collections of functions and data to perform the functionality of the software product. These collections of functions and data are known as "classes." For each class within the software product, the preferred embodiment provides a corresponding empty class ("shell class") that is customizable and that inherits the corresponding class. The shell class is empty in the respect that it contains no functions or data. The customer of the software product may add whatever customizations they desire into these shell classes, which will then supersede the processing of the corresponding class ("standard class"). In other words, a function that is provided by the software product in a standard class may be customized in a shell class and the customized version of the function will be executed in lieu of the corresponding function in the standard class. Hence, when the standard classes are revised, as is typically done upon the release of a new version of the software product, since the customized function is executed in lieu of the corresponding function, no changes need to be made in order to use the customizations; the customizations are reusable. The standard classes are generated as part of the development of the software product. The shell classes are generated in response to the generation of the standard classes. As such, both the standard classes and the shell classes are received by the customer as part of the software product with their definitions contained in the source code.

In addition, the preferred embodiment allows for the customizations added to one shell class to be used by other shell classes within the software product. This feature is provided by the preferred embodiment by grouping all standard classes and shell classes into pairs of classes. Each pair contains a standard class and a shell class for that standard class. The two classes have a hierarchical relationship in which the standard class is the parent and the shell class is the child. That is, the shell class directly inherits the standard class. The pairs are then arranged hierarchically in such a manner as to allow for the use of customizations within one shell class to be used by another. In accordance with this hierarchical arrangement, when two pairs are to be placed in the hierarchy with the first pair being a parent to the second pair, the shell class of the first pair is directly inherited by the standard class of the second pair. The use of pairs of classes and the hierarchical arrangement of the pairs allow for the propagation of customizations throughout the software product that are reusable. These concepts are discussed in greater detail below.

In order to provide its functionality, the preferred embodiment uses various object-oriented techniques. Thus, an overview of object-oriented techniques is helpful. A "class" is used to define and encapsulate values and operations on these values. The values are referred to as "data members" of the class because they contain data. The operations performed on the values are contained within functions of the class and these functions are referred to as "function members" or "methods." Classes in the C++ programming language are considered to be an extension of the "struct" construct within the C programming language because they contain functions in addition to data. An "object" is an instance of a class.

Within a class, function members and data members (collectively referred to as "members") can be defined as being either public, private, or protected. A "public" member can be accessed by any function within the software product. A "private" member can be accessed only by function members within the same class. A "protected" member can only be accessed by classes that are within the hierarchy and is thus invisible to all other classes. Data members are usually only accessed by the function members within its class and, therefore, data members are typically declared as being private. An example of a class is depicted below in Code Table 1 using C++ pseudo code.

CODE TABLE 1

```
class example {
public
    int a;
    int b( ) { a=5;return a;}
private:
    int c;
    int d( ) { c=10;return c;}
};
```

As can be seen from the example class, there are two data members "a" and "c" and two function members "b" and "d." The members "a" and "b" are declared to be public and the members "c" and "d" are declared to be private.

Although a class may have private members, a class may provide access to these members from another class by declaring another class to be a friend class. A "friend" class has access to all of the members of the friending class, regardless of whether the members are declared as being public, private, or protected. The declaration that a class is a friend class occurs in the friending class. An example of a friend class is illustrated below in Code Table 2.

CODE TABLE 2

```
class A {
    friend class B;
private:
    int foo;
    void set_foo( ) {foo = 5;}
};
class B {
public:
    int adder( ){foo = foo + 1; return foo;}
};
```

As can be seen from the above example, class A has defined class B to be a friend by utilizing the statement "friend class B;". As such, the function members of class B (i.e., adder) can access the private members (i.e., foo and set_foo) of class A.

Figure 1:
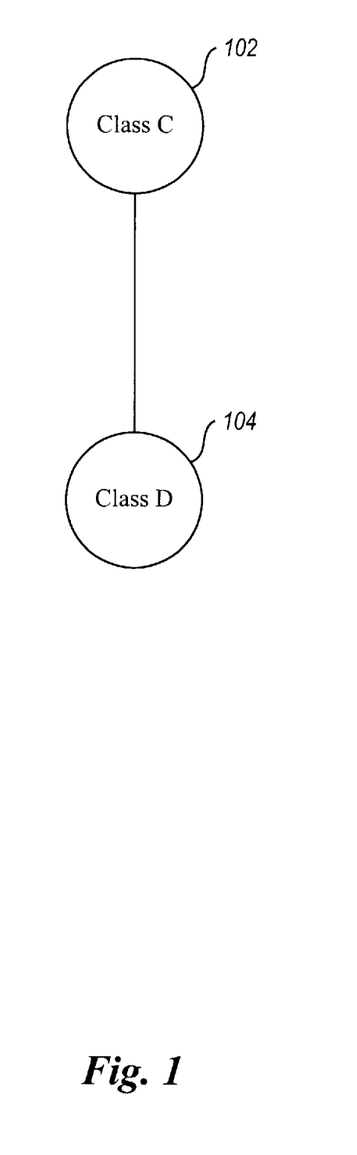
FIG. 1 depicts the hierarchical relationship between two classes in a parent-child relationship where one class is a base class and the other class is a derived class.

One beneficial aspect of object-oriented programming is the use of inheritance. The term "inheritance" refers to a technique for implementing a derived type as a refinement or extension of another type by specifying the difference and reusing the common implementation. Inheritance is used primarily for code reuse, which refers to the ability of a class to use the code or function members of classes that are higher within its hierarchy. FIG. 1 depicts a diagram illustrating the hierarchical relationship between two classes. In FIG. 1, class C 102 is the parent of class D 104. Class C 102 is referred to as a "base class" and class D is referred to as a "derived class." Since class D is a derived class of class C, class D can use all of the members of class C that are either public or protected. A code sample depicting the inheritance relationship is provided below in Code Table 3.

CODE TABLE 3

```
class C {
protected:
    int foo;
    void set_foo( ) {foo = 5;}
    int adder( ) {return (foo + 5); }
};
class D : C {
protected:
    int multiplier( ) {return(foo * 5); };
};
```

As can be seen from the above example, class D is derived from class C as denoted by the declaration "class D : C". Since class D is derived from class C, its function members (i.e., multiplier) have access to the members (i.e., foo, set_foo, and adder) that are defined as either protected or public within class C.

Another concept of object-oriented programming is the concept of overriding. The term "overriding" refers to a function member having the same name in a derived class as a function member declared in one of its base classes. When this occurs, the function member in the derived class overrides the function member of the base class and the functionality performed by the function member of the derived class supersedes the functionality performed by the function number of the base class. In other words, the function member of the derived class is executed in lieu of the function member of the base class if the function member is accessed through the derived class. An example of the concept of overriding is provided below in Code Table 4.

CODE TABLE 4

```
class E: C {
protected:
    int adder( ) {foo += 10; return foo;}
};
main ( ) {
    E obj; //create instance of class E
    int retval;
    retval = obj.adder( ); //invokes E::adder instead of C::adder
}
```

In Code Table 4, class E is defined to be a derived class of class C. Within class E, a function member "adder" is declared that has the same name as a function member within class C. As such, any references to this function member from an object of type class E will execute the "adder" function member of class E as opposed to the "adder" function member of class C. The preferred embodiment provides for the reusability of customizations to a software product and other advantages by using the above-described object-oriented techniques.

Figure 2:
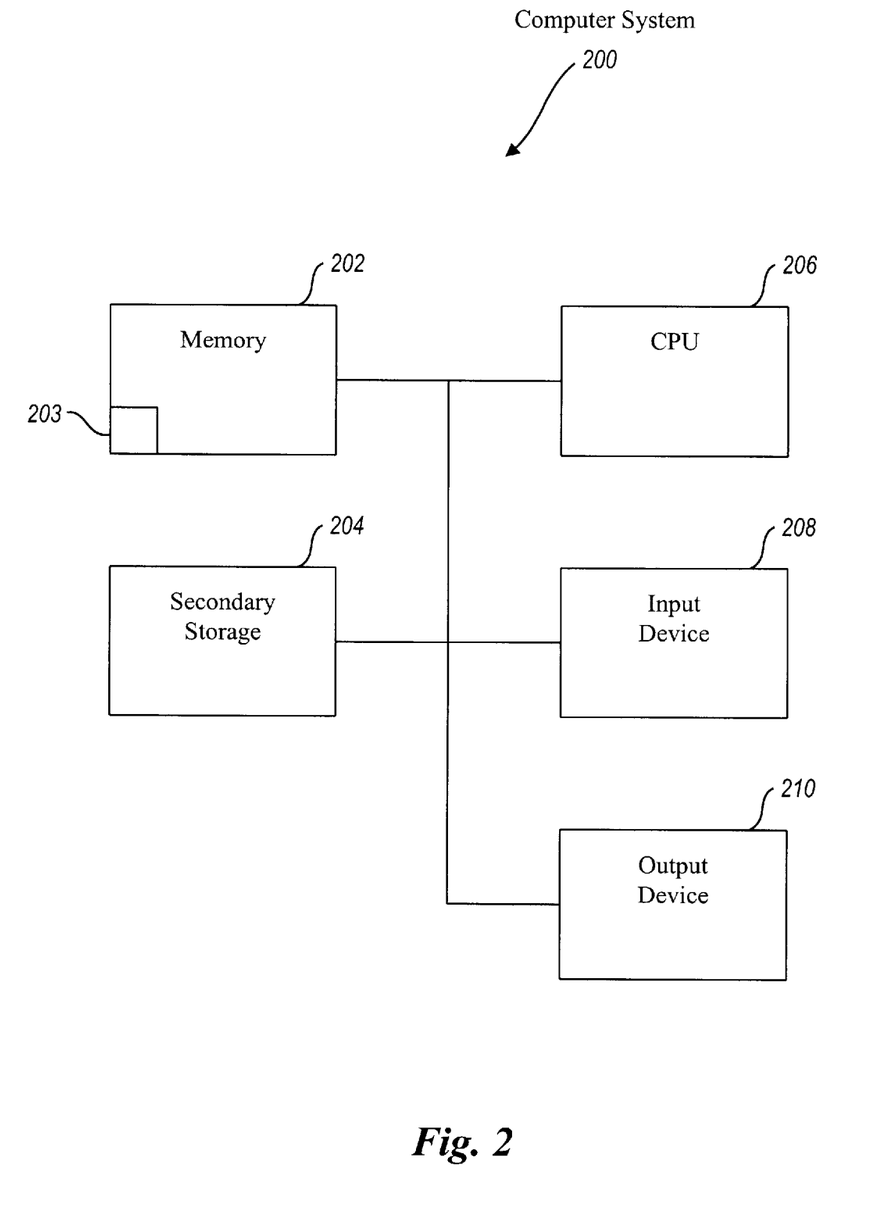
FIG. 2 depicts a computer system suitable for practicing the preferred embodiment of the present invention.

FIG. 2 depicts a computer system 200 that is suitable for practicing the preferred embodiment of the present invention. The computer system 200 contains a memory 202, a secondary storage device 204, and a central processing unit (CPU) 206. The memory contains a software product 203 that is customizable in accordance with the preferred embodiment of the present invention. The computer system 200 further contains an input device 208, such as a keyboard, and an output device 210, such as a screen display.

Figure 3:
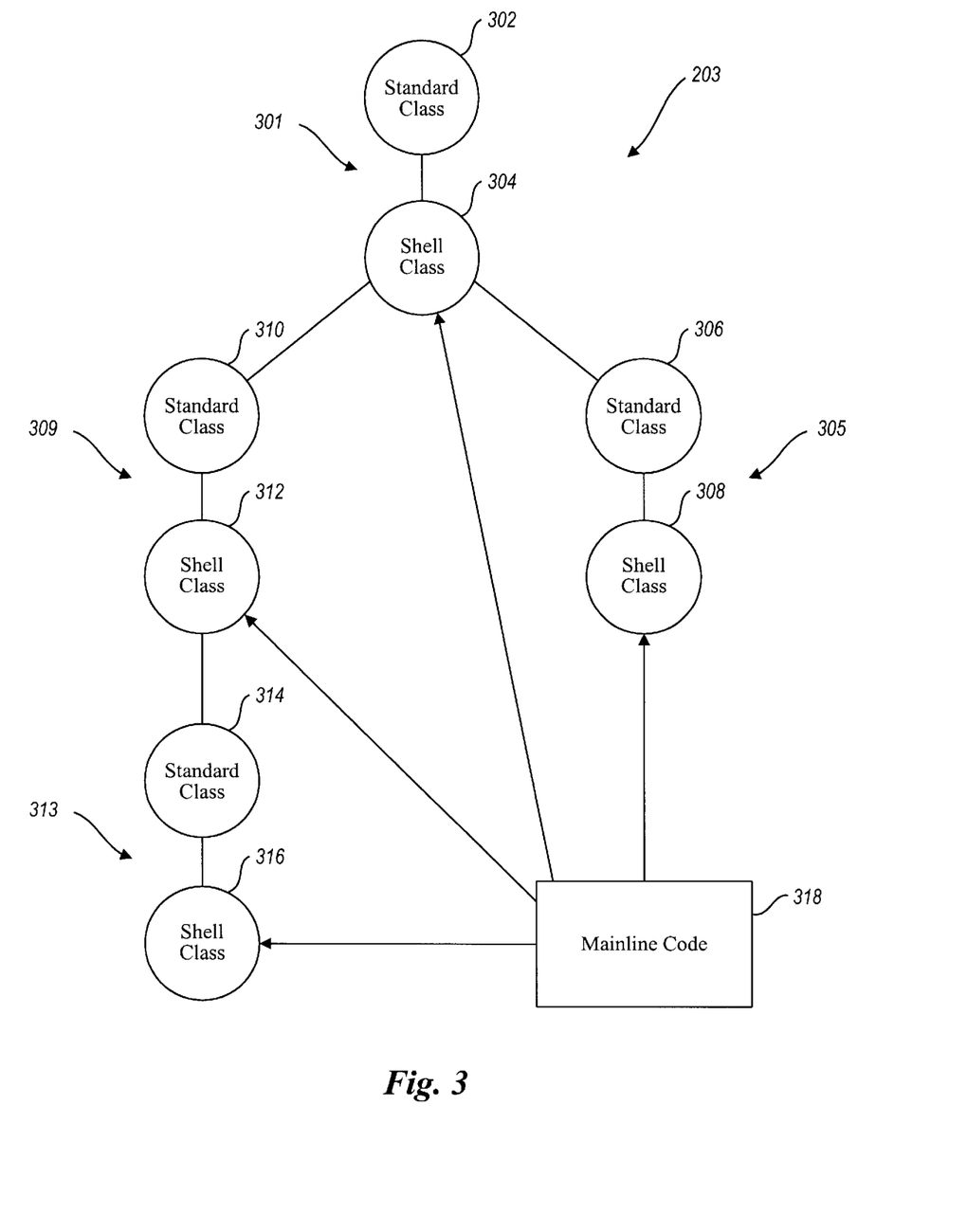
FIG. 3 depicts an architectural overview of a software product in accordance with the preferred embodiment of the present invention.

FIG. 3 depicts an architectural overview of the software product 203. The software product 203 contains a class hierarchy containing pairs of classes 301, 305, 309 and 313 and mainline code 318 that accesses the class hierarchy. Each pair of classes (e.g., 301) contains a standard class (e.g., 302) and a shell class (e.g., 304). The standard class contains the code and data that performs the functionality of the software product. The shell class is initially empty when provided to a customer and can be used by the customer to hold customizations. In the preferred embodiment, each shell class 304, 308, 312, 316 is derived from its corresponding standard class 302, 306, 310, 314 and is defined to be a friend of its corresponding standard class. Each pair of classes 301, 305, 309, 313 is hierarchically arranged in such a manner that all pairs of classes in a direct parent-child relationship have the standard class of the child derived from the shell class of the parent. For example, pair 301 and pair 309 are in such a parent-child relationship where the shell class 304 of pair 301 acts as the base class to the standard class 310 of pair 309 derived therefrom. By arranging the pairs in this manner, the customizations made to a shell class that is higher in the hierarchy than another shell class are accessible from the other shell class. For example, if a customer adds customizations to shell class 304, these customizations are accessible by all shell classes that are lower in the hierarchy, such as shell classes 308, 312 and 316.

In order to ensure that all customizations to the software product 203 are reusable, the mainline code 318 of the software product 203 is defined to access the class hierarchy through the shell classes 304, 308, 312, 316 of the class hierarchy. As such, any customizations that are added to the class hierarchy will then automatically be used by the mainline code 318. For instance, since the mainline code 318 accesses the functionality performed by the pair of classes 305 through the shell class 308, if any customizations were added to the shell class 308, the customizations would be automatically used by the mainline code 318.

By using the class hierarchy in accordance with the preferred embodiment, the preferred embodiment provides for the reuse of customizations made to the software product 203. That is, when the software product 203 is released to customers, the standard classes 302, 306, 310 and 314 as well as the mainline code 318 are the only entities within the software product that contain code and data. The shell classes 304, 308, 312 and 316 are empty classes that initially contain no code or data. When the user customizes the software product in accordance with the preferred embodiment, the user customizes the shell classes 304, 308, 312 and 316 to incorporate their customizations. As such, when a new release of the software product 203 is provided to the customer, any modifications to the software product are located in the standard classes 302, 306, 310, 314 and the shell classes 304, 308, 312, 316 remain undisturbed from their customized form. Therefore, when the mainline code 318 accesses the class hierarchy through the shell classes 304, 308, 312, 316, the customizations are still used and will either augment or supersede the functionality of these standard classes depending on whether the shell classes have added a new function member or redefined an existing function member. Hence, the customizations are reusable.

Figure 4:
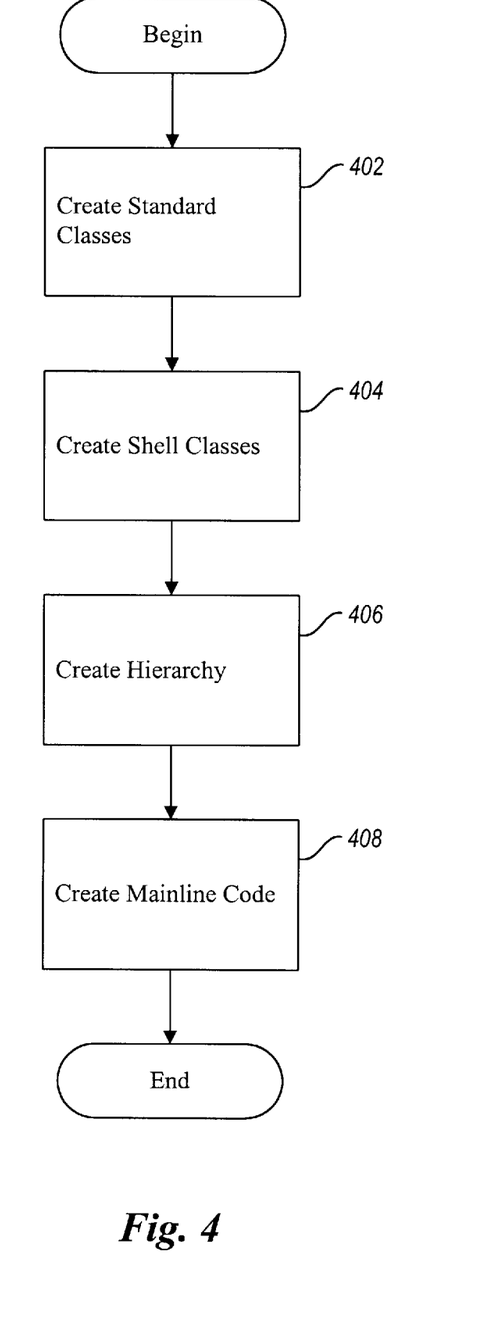
FIG. 4 depicts a flowchart of the steps performed when developing a software product in accordance with the preferred embodiment of the present invention.

FIG. 4 depicts a flowchart of a functional overview of the steps used in developing a software product in accordance with the preferred embodiment. The first step performed in order to take advantage of the benefits of the preferred embodiment is for the developer of the software product to create the standard classes that contain the function members and data members necessary to perform the functionality of the software product (step 402). The processing performed in this step is dependent on the functionality performed by the software product. After creating the standard classes, the corresponding shell classes for each standard class are created (step 404). It should be appreciated that this step may be performed automatically as part of a software development system. In this case, whenever a standard class is created, a corresponding shell class is automatically generated. In this step, each shell class is paired up with its corresponding standard class and is defined to be both derived from the standard class and a friend of the standard class. Next, the developer creates the class hierarchy (step 406). In this step, the developer determines the hierarchical relationships between the pairs of classes and then forms the hierarchy. In forming the hierarchy, when two pairs of classes are to be connected in a parent-child relationship, the standard class of the child is derived from the shell class of the parent. After creating the hierarchy, the mainline code is created in such a manner as to access the class hierarchy through the shell classes of the class hierarchy (step 408). After creating the mainline code, the software product can take advantage of the benefits of the preferred embodiment, which includes all customizations made to the shell classes being reusable.

Figure 5:
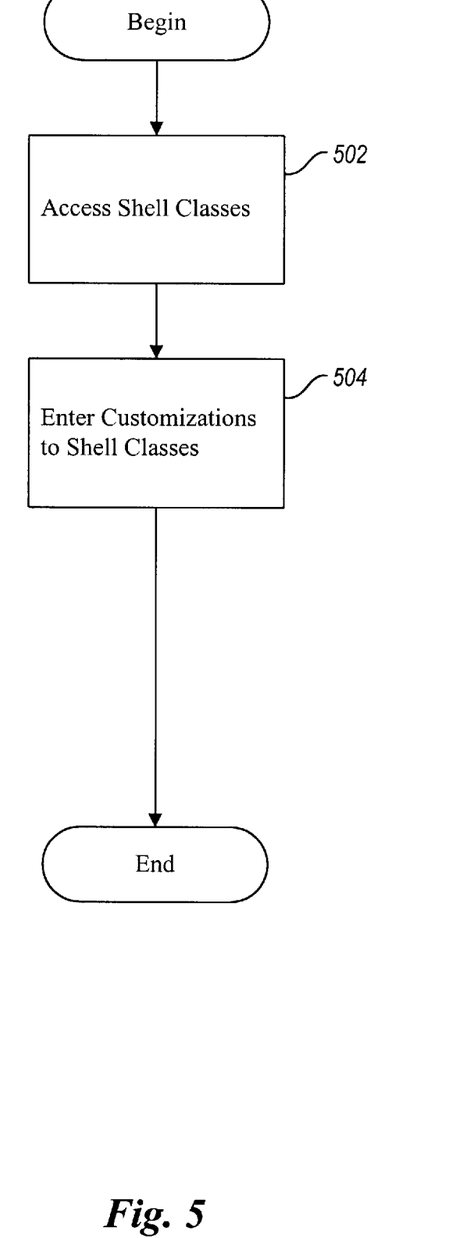
FIG. 5 depicts a flowchart of the steps performed by a customer when customizing a software product in accordance with the preferred embodiment of the present invention.

FIG. 5 depicts a flowchart of the steps performed by a customer when customizing the software product in accordance with the preferred embodiment. The first step in customizing the software product is to access the shell classes that are to contain the customizations (step 502). In this step, the customer accesses the source code of the software product and identifies the shell classes in which to add the customizations. The shell classes, as previously stated, were generated as part of the development of the software product and their definition is contained in the software product's source code. After accessing the shell classes, the customer enters customizations to the shell classes (step 504). In this step, the customer can either add new functionality, by adding a new function or data member, or the customer can change functionality by redefining an existing function member so as to override the functionality of the existing function member. After entering the customizations to the shell classes, the customer recompiles and relinks the software product and the software product is then customized to the specifications of the customer. In addition, when a new release of the software product becomes available, the user may still use their customizations, as well as take advantage of the new release of the software product. In order to do so, all that the customer needs to do is recompile and relink.

Following is a simple example of the implementation of a software product in accordance with the preferred embodiment using C++ pseudo code.

CODE TABLE 5

```
class deduction {
    friend class c_deduction;
    float expense;
protected:
    void set_expense(float exp) {expense = exp;}
    float get_deduction ( ) {return expense;}
    print_deduction( ) {printf("The deduction is %4.2f\n",
    get_deduction( ));
}
}
class c_deduction: deduction {
protected:
    void help( ) {printf("One hundred percent of this expense is tax
deductible\n");}
    get_deduction {
        float exp;
        printf("the current expense is %4.2f Do you want a new
```

CODE TABLE 5-continued

```
one?\n","exp);
        input(exp);
        if (exp != NULL)
        expense = exp;
        deduction::get_deduction( );
    }
}
class mortgage_interest: c_deduction {
    friend class c_mortgage_interest;
}
class c_mortgage_interest: mortgage_interest {
protected:
    print_deduction( ) {printf("The interest deduction is %4.2f\n",
get_deduction( )); }
}
class medical : c_deduction {
    friend c_medical;
    float get_deduction{
        float salary;
        salary = obtain_salary( );
        if ((.07* salary) > expense)
            return (expense - (.07* salary));
        else
            return 0;
    }
}
class c_medical : medical {
    void help ( ){printf("Only expenses over seven percent
    of your salary are
deductible\n);}
}
main ( )
{
    /* Declarations */
    c_medical    objm;
    c_interest   obji;
    /* medical deduction */
    objm.help( );
    objm.set_expense( );
    objm.get_deduction( );
    objm.print_deduction( );
    /* Mortgage interest deduction */
    obji.help( );
    obji.set_expense( );
    obji.get_deduction( );
    obji.print_deduction( );
}
```

Figure 6:
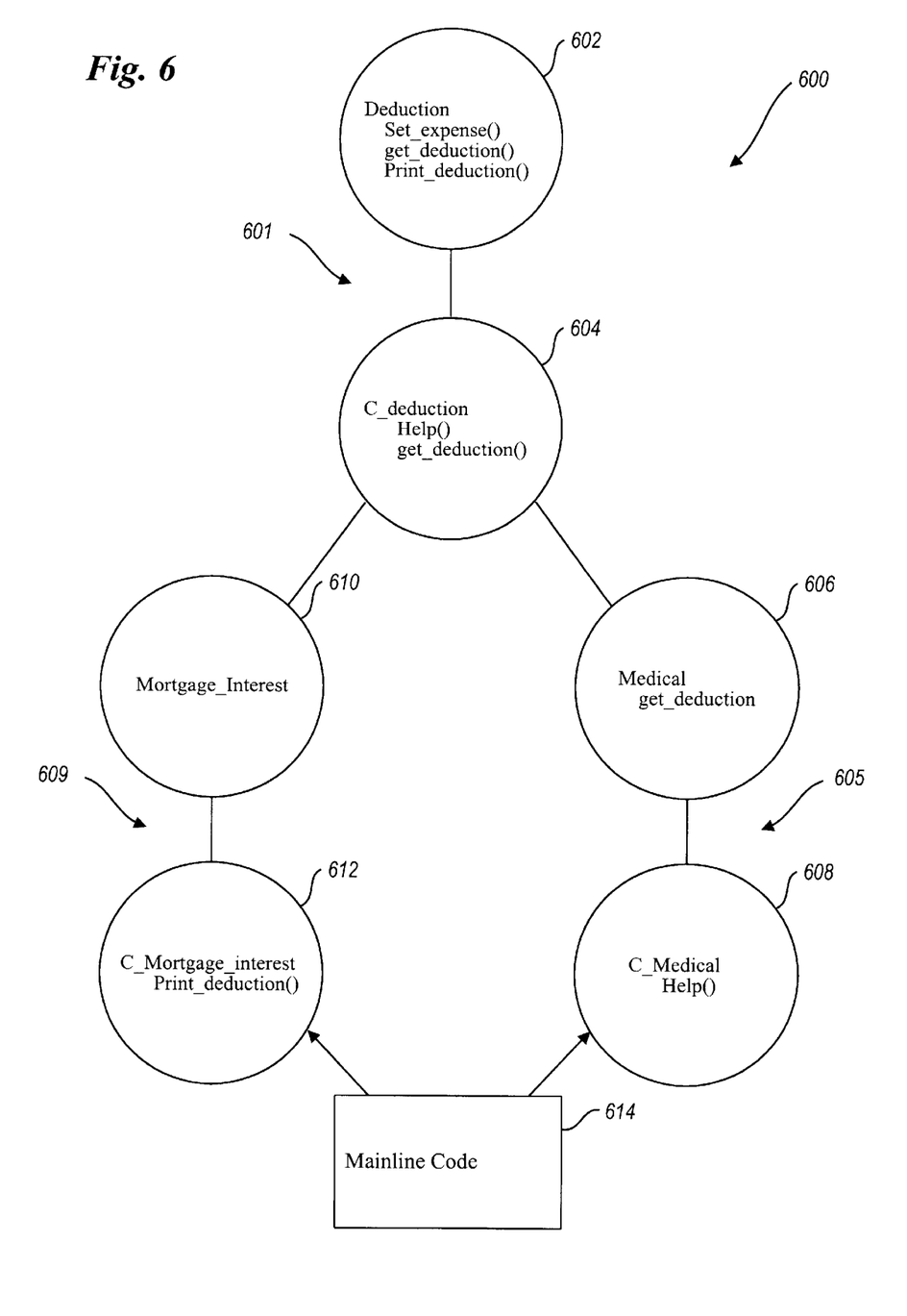
FIG. 6 depicts the class hierarchy of an example software product in accordance with the preferred embodiment of the present invention.

In the above example, the software product calculates deductions for an income tax return. The class hierarchy of this example is depicted in FIG. 6. Class hierarchy 600 contains three pairs of classes 601, 605 and 609. Each pair of classes includes a standard class (e.g., 602) and a shell class (e.g., 604). The standard class contains the code and data provided by the developers of the software product, and the shell class contains the customizations added thereto by the customers. The mainline code 614 accesses the class hierarchy 600 through the shell classes 608 and 612. Pair 601 reflects a generic deduction class off of which are derived two specific deduction pairs of classes 609 and 605. Pair 605 is used to calculate a medical deduction, and pair 609 is used to calculate a mortgage interest deduction.

With reference to Code Table 5, the standard class "deduction" is defined with three function members: "set_expense," "get deduction," and "print_deduction." The standard class "deduction" defines a shell class "c_deduction" as being a friend. The "c_deduction" class contains customizations. In order to add customizations to the "c_deduction" class, the customer has added a function member "help" and has overridden a function member from the "deduction" class. This overriding function member is "get_deduction." The customer has redefined "get_deduction" so as to query the user whether they would like to change the expense upon which the deduction is being calculated and, if so, this function member lets the user redefine it. From the "c_deduction" shell class is derived two classes: "mortgage interest" and "medical." The "mortgage interest" class has a shell class "c_mortgage interest" which is declared as a friend. Within the "c mortgage interest" shell class, the customer has redefined the "print_deduction" function member of the deduction class. The "medical" class is also derived from the "c_deduction" class and redefines the "get_deduction" function member since medical deductions are calculated differently from mortgage interest deductions under U.S. tax code. As such, the "get_deduction" function member performs this functionality. The "medical" class has a shell class "c_medical" that is defined as a friend. The shell class "c_medical" has a customization that adds the "help" function member.

The mainline code, as depicted above, is a simple example wherein an instance of the "c_medical" class and an instance of the "c_interest class" are created. That is, two objects are created. Through the c_medical object, the mainline code invokes the "help" function member to display some helpful information, the "set_expense" function member to set the expense upon which to calculate the deduction, the "get_deduction" function member to calculate the deduction, and the "print_deduction" function member to print the deduction. Through the mortgage interest object, the mainline code invokes the help function member, the set_expense function member, the get_deduction function member, and the print_deduction function member.

In order to illustrate the reusability and other benefits of the preferred embodiment, the customizations of the example software product in Code Table 5 are now discussed in greater detail. The "help function" member in the "c_deduction" shell class is one such customization. This function member is accessible and available to both the "c_deduction" shell class and the "c_mortgage_interest" shell class. That is, an object of type "c_mortgage_interest" can invoke the help function member of "c_deduction." Even after the developers of the software product revise the standard classes "deduction" and "mortgage_interest," the "help" function member is still available to objects of type "c_deduction" and "c_mortgage_interest," which illustrates the reuse of customizations. In addition, this example illustrates the reuse of a customization that is located in one portion of the hierarchy, yet accessible by other portions of the hierarchy. The "c_deduction" shell class also contains another customization that redefines the "get_deduction" function member. Where the "help" function member added functionality, the "get_deduction" function member modifies pre-existing functionality. The customization of the "get_deduction" function member is accessible by objects of type "c_deduction" and objects of type "c_mortgage_interest."

Within the "c_mortgage_interest" shell class, the customer has redefined the "print_deduction" function member to override the "print_deduction" function member declared in the "deduction" class. As can be appreciated, objects of type "c_mortgage interest" can utilize the "print deduction" customization regardless of whether the developers of the software product revise the "mortgage_interest" standard class.

The "c_medical" shell class contains a customization that redefines a previous customization. That is, the "c_medical" shell class has redefined the "help" function member to override the "help" function member previously declared in the "c_deduction" shell class. This customization is reusable even if both the "medical" standard class changes and the "deduction" standard class changes.

While the present invention has been described with reference to a preferred embodiment thereof, those skilled in the art will know various changes in form that may be made without departing from the spirit and scope of the claimed invention as defined in the appended claims.

I claim:

1. A method for customizing a computer program comprising the steps of:

receiving source code for the computer program, the computer program having a standard class and a shell class, the standard class providing a function providing a standard behavior, the shell class inheriting the standard class and providing no additional behavior to the standard behavior, wherein the computer program accesses the standard behavior by instantiating an object of the shell class and invoking the function of the standard class that is inherited by the shell class, the source code being compilable and executable to perform the standard behavior;

customizing the shell class to perform customized behavior by defining an overriding function to override the function and to provide the customized behavior;

compiling the source code of the computer program with the customized shell class; and executing the computer program compiled with the customized shell class, wherein the computer program instantiates an object of the customized shell class and wherein when the computer program invokes the function, the overriding function is executed to perform the customized behavior.

2. The method of claim 1 including the steps of:

after executing the compiled computer program, receiving a new version of the source code of the computer program that includes a new behavior;

compiling the new version of the source code of the computer program with the customized shell class; and executing the compiled computer program, wherein the computer program instantiates an object of the customized shell class, wherein when the computer program invokes the function, the computer program executes the overriding function to perform the customized behavior, and wherein the computer program performs the new behavior.

3. The method of claim 1 including the steps of:

after executing the compiled computer program, receiving a new version of the source code of the computer program that includes a new behavior for the function of the standard class;

compiling the new version of the source code of the computer program with the customized shell class; and executing the compiled computer program, wherein the computer program instantiates an object of the customized shell class and wherein when the computer program invokes the function, the computer program executes the overriding function to perform the customized behavior rather than the new behavior of the standard class.

4. The method of claim 1 including the steps of:

compiling the source code of the computer program with the shell class; and executing the computer program that is compiled with the shell class, wherein the computer program instantiates an object of the shell class and wherein when the computer program invokes the function, the function is executed to perform the standard behavior.

5. A method for customizing a computer program comprising the steps of:

receiving the computer program, the computer program having a standard class and a shell class, the standard class providing a function providing a standard behavior, the shell class inheriting the standard class and providing no additional behavior to the standard behavior, wherein the computer program is designed to access the standard behavior through the shell class by instantiating an object of the shell class and invoking the function of the standard class that is inherited by the shell class, the computer program being executable to perform the standard behavior;

customizing the shell class to perform customized behavior by defining an overriding function to override the function and to provide the customized behavior; and executing the computer program, wherein the computer program instantiates an object of the shell class as customized and wherein when the computer program invokes the function, the overriding function is executed to perform the customized behavior since the computer program is designed to invoke the function through the shell class.

6. A method for modifying a computer program having a hierarchy of standard classes to allow for customization of class behavior, each standard class having a definition and a standard behavior, each standard class other than root classes inheriting another standard class, the method comprising the steps of:

receiving source code of the computer program including the definitions of the standard classes;

for each standard class, generating a corresponding shell class that inherits the standard class, the shell class providing no behavior other than the standard behavior inherited from the standard class; and for each reference to the standard class that is within the computer program but that is not within the definition of the standard class and that is not within the definition of the corresponding shell class, modifying the reference to refer to the corresponding shell class so that when customized behavior is added to the corresponding shell class, the customized behavior overrides the standard behavior of the standard class throughout the computer program.

* * * * *